United States Patent Office 3,042,516

Patented July 3, 1962

3,042,516

PRINT-OUT COMPOSITIONS FOR PHOTOGRAPHIC PURPOSES AND PROCESS OF USING SAME

Eugene Wainer, Cleveland Heights, Ohio, assignor to Horizons Incorporated, Cleveland, Ohio, a corporation of New Jersey No Drawing. Filed Sept. 22, 1959, Ser. No. 841,460

12 Claims. (Cl. 96—48)

This invention relates to compositions of matter which are sensitive to light and suitable for photographic and photographic reproduction purposes and to processes for using such compositions. More particularly, this invention relates to the production of stable colored print-out images produced by exposing dry films formed from such compositions of matter to light, the compositions comprising: a base consisting of a plastic binder or film-forming dispersing medium, originally dissolved in a suitable solvent; one or more aryl amines; one or more halogenated hydrocarbon compounds selected from the group consisting of halogenated hydrocarbon compounds which are capable of generating free radicals on exposure to ultraviolet or visible light; and one or more sulfur compounds which may be either organic or inorganic sulfides, and the compositions may also include one or more additional constituents which affect the stability and/or sensitivity of the system.

In general, the compositions of the present invention provide a photographic system from which a stable image may be obtained entirely by dry processing techniques, namely, simply by exposure to ultraviolet light followed by exposure to air containing significant amounts of moisture. Oxygen may be used in place of the air, in which case the fixing reaction is more rapid. Such a system has utility in the photocopy field of blueprints and technical information, the reproduction of typed and printed pages, the reproduction of information as exposed through microfilm, the recording of information of transient events as on the face of a cathode-ray tube, and the like.

Principal objects of this invention are to effect a reaction between suitable arylamines, halogenated hydrocarbon compounds, and sulfur compounds as above described so that under the influence of ultraviolet light a colored derivative is produced as the result of the foregoing reaction; to develop this color-forming reaction rapidly enough so that the total time of exposure and development may be accomplished in a few seconds in order to make available a permanent and stable image; to provide systems in the exposure, development and fixing stages which may be processed by totally dry techniques; to provide means of fixing which permits stabilization of the image and the elimination of the sensitivity to ultraviolet light simply on exposure to air, preferably moist, in the absence of ultraviolet light; to provide means of stabilization of the preexposed surfaces so that the desired color reactions take place only on exposure to radiation of specific nature; to provide means of stabilization of the developed image so that once formed, it is sufficiently permanent for practical purposes; to provide means of stabilization of unexposed portions of the image so that on continued exposure to light after the first images are formed, color and fogging does not develop; to provide print-out systems which are sensitive to visible light; to provide a range of colored images with respect to hue and tint; and, it is a further object of the invention to establish systems in which the desired color is developed by exposure to light and the facility for producing such color as a result of continued exposure to light of a similar wavelength is destroyed by exposure of the system (after the image has been once developed) to moist air in a state of motion either in the dark or in light in which the ultraviolet portions have been eliminated. These and other objects of the invention will become apparent from the description which follows.

In a copending application, Serial No. 787,112, filed January 16, 1959, an invention was described comprsiing light sensitive print-out compositions which develop color on exposure to light and are capable of being fixed in stable form by subsequent heating, which compositions are composed of arylamines and halogenated hydrocarbons dispersed in a plastic film-forming base, and which may also contain minor amounts of basic materials such as amines or zinc oxide for stabilization of the mixture before exposure, and minor amounts of phenol derivatives for stabilization of the mixture after developing and fixing, and particularly in the presence of light, heat and air. The invention described also comprehended combinations of these arylamines to produce specific color effects, and sensitization of the system to the visible by the addition of a yellow to red type color former, exposure to ultraviolet if this visible range color sensitizer is not present, and finally disposing such over-all system on a suitable base such as glass, paper, plastic film, and the like.

Further, in this copending application, it is pointed out that fogging of the unexposed portions develops slowly over a period of weeks on exposure to air in the presence of light or heat or both, and it appears that this reaction requires the presence of air, in that the colors which develop as a result of fogging tend to be different in hue than those obtained by the primary halogenating reaction. This defect was minimized or eliminated by the addition of minor percentages of certain reducing agents, and by heat fixing as a further step. Other techniques such as overcoating and the like were also utilized.

Further, as described in the same copending application, some of the halogenated hydrocarbons are so active that they require stabilization through the addition of mild bases such as alkyl amines, zinc oxide, and the like in the formation of the active mixture prior to formation on the film.

The compositions of the present invention constitute improvements over those described in the aforesaid application. The present compositions eliminate the need not only for the relatively complicated stabilization system for prevention of fogging on storage prior to exposure or fogging in the unexposed areas after exposure, but also eliminate the need for heat fixing. These compositions make it possible after photographic exposure of dry film to ultraviolet light to obtain an image which is self-fixing simply by exposure of the pictorial image to still air, preferably moist, for a period of 8 to 10 hours, in which all portions of the film have ready access to air. If the air is moving, the fixing is completed within two to three hours. By the term "fixing" is means a condition whereby not only will the unexposed portion of the film no longer fog on standing, but also a condition wherein the exposed portions of the film are no longer sensitive to development of color on exposure to ultraviolet light. A further feature of this improvement resides in the fact that the solutions prior to deposition on a suitable base are indefinitely stable when placed in a bottle in which the air has been substantially replaced with solvent fumes. If the bottle is brown colored and kept tightly covered, an indefinite stability is available. Further, the prepared plate after spreading the composition and drying the same is also indefinitely stable on storage providing it is placed in a container which is sealed against the intrusion of air. The adverse effects of the intrusion of air may still further be minimized by the deliberate addition of crystals of some of the agents which are present in the raw photosensitive mix. Still another important benefit is the elimination of the heating step for fixing purposes.

Finally, in the referred to copending application, it is noted that certain of the halogenated hydrocarbons required prestabilization in order to reduce their activity, and such prestabilization involved the deliberate addition of weak alkalies to the mixture. It is a further advantage of the present invention that the need for such prestabilization additives has been obviated.

Describing my invention first in general terms, I have found that certain secondary and tertiary amines and to a very much lesser extent, primary amines, separately or in combination, when mixed with certain organic halogen compounds which may be alkyl or aryl derivatives or mixtures thereof, plus an addition of certain sulfur compounds which may be organic or inorganic in nature will, depending on the nature of the amine, the organic halogen compound in question and the sulfur compound, produce brilliantly colored products on exposure to light in times of a few seconds. The images obtained may be either in the form of line copy or continuous tone by use of techniques as described later. In general the basic sensitivity of the system is in the ultraviolet becoming substantial at 4000 A. and less, the photographic speed increasing as shorter and shorter wavelength ultraviolet is used as the exposing energy. Sensitivity to the visible may be incorporated through the addition of certain azo-aniline type compounds which exhibit a yellow color in solution.

While the color forming reaction may be effected by exposure of solutions containing the above combination of reactants to ultraviolet radiation, it has been found preferable to deposit the several reactants in the form of a thin film wherein they are dispersed in a suitable base or binder. In this way, a dry system is presented for exposure, development and processing, with outstanding advantages noted above.

All of the various ingredients of the light sensitive compositions of this invention are dispersed or dissolved in a suitable binder. More uniform results are obtained if at least a portion and preferably all of the ingredients are soluble in the binder. The primary exception to this requirement is where insoluble pigments are utilized both for the development of continuous tone and as an active sulfiding agent. In addition to the solvents and plastic materials, plasticizing agents such as high boiling point liquids may also be utilized to improve the flexibility of the film and to still further improve the degree of solution of the active agents.

The types of binders and recommended solvents for these binders are listed in Table 1. Solvents for the binders have been chosen with two requirements as the foundation for the choice. The first is the ability to produce a relatively low viscosity solution of the polymeric material in question for concentrations of plastic in the range of 5 to 15%, and the second requirement imposed on the solvent is to insure as good solubility for other reagents as possible.

TABLE 1

*Plastic Bases (10% Solutions)*

[All parts are by weight]

| Number | Binder | Solvent |
|---|---|---|
| 1 | cellulose acetate | 30 methylene dichloride+70 acetone. |
| 2 | cellulose nitrate | 30 ethyl alcohol+70 ethyl ether. |
| 3 | chlorinated rubber | 70 toluene+30 acetone. |
| 4 | ethyl cellulose | 30 acetone+40 toluene+30 methyl alcohol. |
| 5 | polyethylene | 90 toluene+10 acetone. |
| 6 | polymethylmethacrylate. | 70 acetone+30 ethyl acteate. |
| 7 | polystyrene | 90 toluene+10 acetone. |
| 8 | polyvinylacetate | 40 methyl alcohol+40 acetone+20 toluene. |
| 9 | polyvinylchloride | 80 tetrahydrofuran+20 acetone. |
| 10 | polyvinylidine chloride copolymer. | 80 tetrahydrofuran+20 acetone. |

There appears to be no real distinction between the various types of plastic materials which might be utilized as a base. The main requirements are that they be essentially neutral, that is, not exhibit distinctly acid or basic characteristics, and that they be non-hygroscopic. These resin systems may be dispersed on any substrate such as glass, paper, plastic films, and the like.

The second essential constituent of my composition is a halogenated hydrocarbon. The halogenated hydrocarbons useful for the purposes of my invention are those organic halogen compounds which when exposed to light of suitable wavelength are decomposed photochemically to produce free radicals. As described in my earlier filed application Serial No. 787,112, the activation energy of formation of the halogen free-radical is the important determining factor and it appears that in order for the halogenated hydrocarbon to be effective in the present process it must have an energy of dissociation or in other words an energy of formation of the free halogen radical of not less than 40 kilogram calories per mole. Each of the halogen compounds hereinafter indicated as preferred, it will be noted, is a halogenated hydrocarbon in which at least one active halogen (cl, Br or I) is attached to a carbon atom having not more than one hydrogen atom attached thereto. The preferred halogenated hydrocarbons are carbon tetrabromide, iodoform, and tetrachlorotetrahydronaphthalene. Other halogenated hydrocarbons which are effective but less useful either for reasons of solubility, volatility, or slow speed of development are bromoform, chloroform, carbon tetrachloride, tetrabrombutane, hexachlorethane, hexachlorbenzene, dichlorbenzene, and the like. It appears that these compounds decompose under the influence of light and particularly ultraviolet light through the formation of two free radicals, one of which is a free radical halogen and a second is a free radical residue. Thus, for example, the free radicals obtained as a result of photodecomposition of carbon tetrabromide would be the bromine free radical and the carbon tribromide free radical. In the reactions to be described, it is not known which portion of the residue is the active agent.

The nature of the halogenated hydrocarbon has a somewhat specific effect on the nature of the color which forms. For example, carbon tetrabromide used as the photohalogenator for diphenylamine will on very short exposures produce a blue, and as the exposure continues to be extended, the color becomes almost black. Iodoform in the same degree of molecular equivalence first produces a greenish-yellow and the color on lengthy exposure is green. The use and effectiveness of these halogenated hydrocarbons has been described in the aforesaid copending application.

The third essential constituent of the color-forming systems of this invention is an aryl amine. Typical amines useful in the systems of present invention are listed below by way of example in Table 2. All of the amines listed are aryl amnies, and it is a requirement that the simple or substituted amine grouping be a side chain attached to an aryl nucleus. Furthermore it has been found that the color-producing action is more effective from the standpoint of depth of color and speed on exposure to light when the amine is substituted with complex substituents. Generally speaking, in the type of compositions which are being described, secondary amines appear to be the most effective with respect to speed of development of color. Tertiary amines are very slightly slower in this respect and single primary amines are exceptionally slow. Significantly, however, mixtures of primary amines yield unexpected results with speeds that are comparable to those obtained by use of secondary amines. For example, in the compositions of the invention aniline used alone usually produces a very faint grayish color, whereas para-toluidine will produce a faint yellow. In both cases, the photoreactions are relatively slow. If a mixture of aniline, para-toluidine, and ortho-toluidine is employed in the system, a very rapid photoreaction is available and deep red colors develop out.

TABLE 2

*Active Amines* [1]

| Number | Name | Formula |
|---|---|---|
| 1 | diphenylamine | $(C_6H_5)_2NH$ |
| 2 | dibenzylamine | $(C_6H_5CH_2)_2NH$ |
| 3 | triphenylamine | $(C_6H_5)_3N$ |
| 4 | N-N'-diethylaniline | $C_6H_5N(C_2H_5)_2$ |
| 5 | N-N'-dimethylaniline | $C_6H_5N(CH_3)_2$ |
| 6 | p-p'-methylenebis(N-N'-dimethylaniline). | $(CH_3)_2NC_6H_4CH_2C_6H_4N(CH_3)_2$ |
| 7 | p-p'-benzylidinebis-(N-N'-dimethylaniline). | $[(CH_3)_2NC_6H_4]_2CHC_6H_5$ |
| 8 | p-p'-p''-methylidine-tris(N-N'dimethylaniline). | $[(CH_3)_2NC_6H_4]_3CH$ |
| 9 | mixture: aniline<br>p-toluidine<br>o-toluidine | $C_6H_5NH_2$<br>$p-CH_3C_6H_4NH_2$<br>$o-CH_3C_6H_4NH_2$ |

[1] The amines are listed to denote the base structures which are active. If the amine is complexed and still retains the same base structure it is also active.

Another type of amine may be utilized in addition to the arylamine in order to extend the sensitivity of the over-all photoreaction to the visible. Compounds which are most suitable for the purpose are yellow azo compounds such as N,N'-dimethylphenylazoaniline and 4-phenylazodiphenylamine. These may be utilized in exceptionally small percentages to impart sensitivity to the visible, generally as high up in the spectral range as green.

The novel additions which distinguish the present invention from that described in Serial No. 787,112 and which make it possible for such systems to be self-fixing on exposure to moist air and still retain stability on storage are sulfur compounds. Sulfur compounds which have been found to be effective for the purpose are listed in Table 3 and it is noted that these are both organic and inorganic in nature. In general, these comprise sulfur compounds taken from the class of thiols, organic disulfides, thioureas, thioacetamides, and the like. Invariably these are sulfur compounds in which the sulfur is attached directly to a carbon atom. The inorganic sulfides which have been found to be effective are light colored or white sulfides which are readily soluble in dilute acids and may be used alone or in mixture, either with themselves or with the organic sulfur compounds indicated in the table. The organic sulfur compounds also may be used in mixture.

TABLE 3

*Stabilizer Sulfur Compounds*

| Number | Name | Formula |
|---|---|---|
| 1 | o-aminobenzene thiol | $NH_2C_6H_4SH$ |
| 2 | Bis(dimethylthiocarbamyl)-disulfide. | $[(CH_3)_2NCS]_2S_2$ |
| 3 | thiourea | $NH_2CSNH_2$ |
| 4 | 1-allyl-2-thiourea | $CH_2:CHCH_2NHCSNH_2$ |
| 5 | 1,3-diethyl-2-thiourea | $C_2H_5NHCSNHC_2H_5$ |
| 6 | dodecanethiol | $CH_3(CH_2)_{11}SH$ |
| 7 | thioacetamide | $CH_3CSNH_2$ |
| 8 | thioacetanilide | $CH_3CSNHC_6H_5$ |
| 9 | thiobenzanilide | $C_6H_5CSNHC_6H_5$ |
| 10 | thiocarbanilide | $C_6H_5NHCSNHC_6H_5$ |
| 11 | thiosemicarbazide | $NH_2CSNHNH_2$ |
| 12 | zinc sulfide | ZnS |
| 13 | zinc cadmium sulfide | ZnS-CdS |
| 14 | cadmium sulfide | CdS |
| 15 | gallium sulfide | $Ga_2S_3$ |
| 16 | indium sulfide | $In_2S_3$ |

In Table 4 are given the ranges of proportions in which these various ingredients may be mixed to produce the desired results.

TABLE 4

*Preferred Composition Ranges of Ingredients Per 100 Parts by Weight of Resin or Plastic Base*

| Number | Reagent | Parts by Weight (Range) |
|---|---|---|
| 1 | Solvent | 500 to 1,000. |
| 2 | Organic halogen compound | 10 to 200. |
| 3 | Aryl amine | 10 to 100. |
| 4 | Preferred ratio of organic halogen compound to aryl amine. | Between 0.5 to 1 and 2 to 1. |
| 5 | Sulfur compound | 1 to 30. |
| 6 | Preferred ratio of aryl amine to organic sulfur compound. | Between 1 to 1 and 30 to 1. |
| 7 | Preferred ratio of aryl amine to inorganic sulfur compound. | Between 10 to 1 and 3 to 1. |
| 8 | Photosensitizer to visible [1] | 0.1 to 1.0. |
| 9 | Plasticizer [1] | 10 to 100. |
| 10 | Ultraviolet absorber [1] | 0.1 to 1.0. |

[1] If present.

Once the combination of reagents and solvent has been disposed on a suitable base, the solvent allowed to evaporate so that a dry film is present and the surface exposed to light so as to produce an image, fixing is readily obtained by permitting the film to be exposed to moving air or oxygen containing moisture. The combination of air and moisture or oxygen and moisture appears to be a requirement.

Plasticizers may be advantageously added to the system in amounts of between 25% and 100% of the weight of the resin present (dry basis) in order to improve the flexibility of the dried film and in certain cases to improve the solubility of agents whose solution is required in order for them to be effective. Suitable plasticizers include: dioctylphthalate, tricresylphosphate, polyethylene glycol, di(2-ethylhexyl)maleate, di(2-ethylhexyl) tetrahydrophthalate and tri(2-ethylhexyl)phosphate.

Further, and significantly, true continuous tone effects may be obtained through use of specific groups of the sulfur compounds which have been mentioned previously. These are not only part of the active chemical system, but as the result of the reaction, finely divided insoluble particles are retained in the film so that development of color in depth may be obtained as a function of the degree of exposure, thus leading to continuous tone.

The usual improvements in photographic speed as a result of exposure to ultraviolet light may also be obtained by adding ultraviolet absorbers as is common in the art. Such ultraviolet absorbers are benzil, stilbene derivatives, phenylsalicylate, and the like. Usually amounts of the order of one-tenth of a percent or less are sufficient for the purpose.

The coating solution prior to deposition is indefinitely stable when stored in a tightly closed brown bottle in which all air has been displaced with solvent fumes. After the coating composition is spread on a suitable substrate and allowed to dry, the sensitive film thus obtained is indefinitely stable if stored in the dark in the absence of air. One of the means for accomplishing this is to place the film in a polyethylene bag and replace the air with nitrogen, and then heat seal the polyethylene. Stability for a period of months may also be obtained without the use of nitrogen, by using a rather thin gauge, polyethylene bag material and wrapping the sensitive plates tightly so as to squeeze out as much of the air as possible before heat sealing. Each time a plate is removed from the bag for use, this squeezing out of the air followed by heat sealing is a requirement. A still simpler techique is to store the sensitive plates in an air-tight container which may be a box or a plastic bag in which a few crystals of carbon tetrabromide have been placed in the bottom of the bag. The extremely low but significant volatility of the material gradually develops an atmosphere of carbon tetrabromide, which apparently prevents the small amount of residual air from being effective as a destroyer of the sensitivity of the plate.

A system has now been described comprising a plastic base or binder, an aryl amine, a free radical producing organic halogen compound, a sulfur compound, with or without the addition of plasticizers, ultraviolet absorbers, and sensitizers to the visible. Such a system is dissolved or dispersed in a suitable solvent or mixture of solvents and is deposited on a suitable base such as glass, plastic, paper, and the like or it may be prepared in the form of a self supporting film. After the solvent has been eliminated by evaporation, the dry film is then exposed to ultraviolet or visible light and such exposure will generally be in the range of 1 to 30 seconds. After exposure, the image is fixed simply by permitting the exposed film to be exposed to moving ordinary air containing the moisture it normally contains in the range of 40 to 75% relative humidity for a period of 8 to 10 hours, preferably in the dark, though ordinary light containing no ultraviolet may also be used if sensitizers to the visible are absent. The action is greatly accelerated if the air is moved rapidly across the surface in which case the fixing takes place in 2 to 3 hours. If moist oxygen is used, fixing takes place in 30 to 60 minutes. After such treatment, the exposed portions are insensitive to visible and ultraviolet light even on long exposure.

The light source utilized for exposure purposes in this specification is the General Electric reflector type sunlamp of 275 watts using a glass envelope. At a distance of 10 inches, exposure times of 1 to 30 seconds are obtained.

Having described my invention, the following examples are indicative of specific methods of practice and are to be construed as illustrative rather than as limiting.

EXAMPLE 1

One hundred (100) ccs. of a solution containing 10 grams of a low molecular weight polyvinyl chloride in an 80:20 mixture of tetrahydrofuran and acetone was mixed with 10 grams of diphenylamine, 15 grams of carbon tetrabromide, 2 grams of bis(dimethylthiocarbamyl)disulfide, and finally 20 ccs. of acetone. The mixture was stirred until all of the ingredients were dissolved, after which the composition was spread on a glass plate so that a dried thickness of approximately 1 mil was obtained.

After all solvent has evaporated, the sensitive surface was exposed to a 275 watt G.E. sunlamp at a distance of 10 inches for a period of 5 seconds, after which time a dense blue-black image was obtained. The exposed film was then placed in a dark cabinet fitted with means to permit the entry of air and therein retained for 10 hours. Subsequent exposure to ultraviolet light provided no noticeable effect even though the ultraviolet exposure comparable to the intensity indicated originally extended for a period of 5 minutes.

EXAMPLE 2

One hundred (100) ccs. of a solution containing 10 grams of a low molecular weight polyvinyl chloride dissolved in an 80:20 mixture of tetrahydrofuran and acetone was mixed with 4 grams of diphenylamine, 6 grams of carbon tetrabromide, 2.0 grams of dodecanethiol and finally 20 ccs. of acetone. The mixture was stirred until all the ingredients were dissolved, after which the composition was spread on glass with a doctor knife so that a dried thickness of 1 mil was obtained.

The dry sensitive surface was exposed for 8 seconds to the 275 watt G.E. sunlamp at a distance of 10 inches giving an exposure color of deep blue-black. The exposed film was fixed by exposing it to moist moving oxygen passed over at a rate of about 1 liter per minute for 45 minutes. The moisture was obtained by bubbling the oxygen through water. Subsequent treatment with ultraviolet light indicated the permanency of fixing, since no further coloration developed on such an exposure.

EXAMPLE 3

To the composition of Example 1 there was added 0.05 gram of N-N'-dimethylphenylazoaniline, 5 grams of dioctylphthalate, and 0.1 gram of phenylsalicylate.

The resulting mixture was spread on a glass plate and allowed to dry, the spreading thickness being such that a finished dried thickness after all solvents have been eliminated was of the order of one mil. It was then exposed to a No. 2 reflector photoflood lamp at a distance of 10 inches for a period of 5 seconds and the dense blue-black color obtained as in Example 1 was developed out with a faintly yellow background. After exposure, the image was fixed by blowing air across the film for a period of two hours.

EXAMPLE 4

A composition was formulated by adding 2.0 grams of para-para'-benzylidinebis(dimethylaniline), 5 grams of tetrachlorotetrahydronaphthalene, 0.5 gram of thiourea, and 3.0 grams of tri(2-ethylhexyl) phosphate to 100 ccs. of a 10% solution of polystyrene in a mixture of toluene and acetone 90:10. After spreading the resulting composition on a glass plate and permitting the solvent to evaporate completely, a film thickness of 1.5 mils was obtained. This was exposed to a G.E. 275 watt sunlamp at a distance of 10 inches for three seconds, after which a rich deep green color was obtained in the light struck areas. This was allowed to stand in the dark box with ready access of air for a period of 10 hours to complete the fixing operation.

EXAMPLE 5

One hundred (100) ccs. of a solution of polyvinyl acetate in a mixture of methyl alcohol, acetone and toluene (40:40:20) was mixed with 2.0 grams of para-para'-para''-methylidynetris(N-N'-dimethylaniline), 8.0 grams of carbon tetrabromide, 2.0 grams of thioacetamide, 10.0 grams of dioctylphthalate, 20 ccs. acetone, and stirred vigorously until the solution of the ingredients was complete. The resulting solution was spread on a paper base and a measurable thickness of 0.8 mil was obtained. This was exposed to a G.E. 275 watt sunlamp at a distance of 10 inches for a period of 2 seconds on which exposure a deep royal blue developed out in the exposed areas. Air from a small fan was blown across the image for a period of 2 hours, after which reexposure to ultraviolet light for a period of 2 minutes indicated no fogging.

EXAMPLE 6

One hundred (100) ccs. of a solution containing 10 grams of polystyrene dissolved in a 90:10 toluene-acetone mixture was mixed with a solution of 2 grams of aniline, 4 grams of para-toluidine, and 4 grams of ortho-toluidine dissolved in 90 grams of toluene. To the resulting solution was added 10.0 grams of carbon tetrabromide, 1.0 grams of thiosemicarbizide, 5.0 grams of tricresylphosphate, 0.1 gram of N-N'-dimethylphenylazoaniline, and 30 ccs. of acetone. The solution was stirred until all of the ingredients were completely dissolved and was then spread on a glass plate and a film thickness of 1.2 mils was obtained. This was exposed for a period of 5 seconds and fixed by storing in a dark cabinet in the presence of air for 12 hours.

EXAMPLE 7

A coating composition was formulated consisting of 100 ccs. of a 10% solution of cellulose nitrate dissolved in a mixture of ethyl alcohol and ethyl ether (30:70), to which there was added 5.0 grams of zinc sulfide, 10 grams of carbon tetrabromide, 5.0 grams of diphenylamine, 0.05 gram of phenylsalicylate, 0.02 gram of N-N-dimethylphenylazoaniline, and 5 grams of dioctylphthalate. After thorough mixing and grinding to disperse the zinc sulfide as completely as possible, the mixture was spread on a glass plate in sufficient thickness to provide a dried film after all solvent was eliminated approximately 1.5 *mils* in thickness. This was exposed to a gray step scale negative for a period of 20 seconds and the image was in a blue-black color. It was fixed by retaining the exposed film in a dark box in the presence of air for 12 hours. Of the thirty steps of gray on the negative, twenty were recorded on the photosensitive surface.

EXAMPLE 8

Twelve 4 x 5 glass plates were coated with the dispersions of Example 1. Separately another twelve plates were coated with the dispersions of Example 7. Six of the plates prepared in accordance with Example 1 and six of the plates prepared in accordance with Example 7 were separately stored as follows: plates were stacked one on top of each other and clear glass plates were placed on the top plate. The packages were inserted in a polyethylene bag which was molded around the plate so as to squeeze out as much of the air as possible and the bag was then heat sealed. One month later, one of the plates was removed from the bag and exposed to ultraviolet light in accordance with the teachings of the previous examples for a period of 6 seconds and a full density image obtained. Repeating the same experiment after sealing the bag but with a three month lapse of time produced substantially the same results. In a second series, six plates each were stored in separate and sealed polyethylene bags in which approximately one gram of carbon tetrabromide was placed in the corner of the bag. These bags were opened six months later and again one of the plates was exposed as taught in the previous examples for a period of 5 seconds and again a full density image was obtained. Simultaneously with the original preparation of these materials, plates prepared in accordance with Example 1 and Example 6 after solvent elimination were stored in a dark cabinet with ready access of air for a period of 12 hours and after exposure to ultraviolet light, no noticeable image was obtained.

I claim:

1. A dry photographic film producing a visible print-out image by exposure to light of a suitable wave length and rendered insensitive to light by exposure to a moist oxygen-containing gas selected from the group consisting of oxygen and air, said film consisting essentially of a film-forming plastic having dispersed therein (1) at least one arylamine; (2) at least one halogenated hydrocarbon compound having an energy of formation of the free halogen radical of not less than about 40 kilogram calories per mol, selected from the group consisting of halogenated hydrocarbon compounds which produce free radicals upon exposure to light of a suitable wave length; and (3) at least one sulfur-containing compound selected from the group consisting of organic sulfides in which the sulfur is attached directly to a carbon atom and inorganic sulfides in which the sulfur is attached directly to a metal atom; there being present in said film between 0.1 and 1.0 part of arylamine by weight, per part of film-forming plastic, betweeen 0.1 and 2.0 parts of halogenated hydrocarbon compound by weight, per part of film-forming plastic and between 0.01 and 0.3 part by weight of sulfide by weight, per part of film-forming plastic, said film-forming plastic being selected from the group consisting of cellulose derivatives and polymers of vinylidene monomers.

2. The film of claim 1 containing in addition an azo compound dispersed in said film-forming plastic base material, to enhance the photosensitivity of said film to visible light.

3. The film of claim 2 wherein the said azo compound is selected from the group consisting of azoanilines and azodiphenylamines.

4. The film of claim 3 wherein the amount of said azo compound is from 0.001 to 0.02 part by weight per part of plastic.

5. The film of claim 1 containing in addition up to about 0.1% by weight of an ultraviolet absorber, dispersed in said film-forming plastic.

6. The film of claim 1 containing in addition between about 0.01 and 1 part by weight of a plasticizer per part by weight of plastic, dispersed in said plastic.

7. The film of claim 1 in which the arylamine is selected from the group consisting of secondary amines, tertiary amines and mixtures of at least two primary amines.

8. The film of claim 1 containing in addition finely divided insoluble pigment, dispersed in said plastic.

9. The film of claim 1 in the form of a self-sustaining translucent film.

10. A print-out member consisting of the film of claim 24 on a support selected from the group consisting of glass, paper and plastic.

11. In a method of fixing brilliantly colored images produced in a photosensitive layer comprising an arylamine and an organic halogen-containing compound by exposure of said layer to ultraviolet light, said exposure being under such conditions that a free radical is produced by decomposition of said halogen-containing organic compound, said halogen-containing compound being selected from the group consisting of halogenated hydrocarbons having an energy of formation of the free halogen radical of not less than about 40 kilogram calories per mol and is reacted with said arylamine to produce a brilliantly colored reaction product in the exposed portions of the layer; the improvements which comprise: providing at least one sulfide selected from the group consisting of organic sulfides in which the sulfur is attached directly to a carbon atom and inorganic sulfides in which the sulfur is attached directly to a metal atom as an additional constituent in said photosensitive layer and fixing the image comprising said colored reaction product by exposing the surface of said sulfide-containing layer to a moist oxygen-containing gas, thereby stabilizing the brilliantly colored image against fading.

12. A method of developing stable brilliantly colored images which comprises preparing a composition consisting essentially of (1) a film-forming plastic base material selected from the group consisting of cellulose derivatives and polymers of vinylidene monomers, (2) at least one arylamine, (3) at least one halogenated hydrocarbon compound having an energy of formation of the free halogen radical of not less than about 40 kilogram calories per mol, selected from the group consisting of compounds which produce free radicals upon exposure to light of a suitable wave length and (4) at least one sulfur-containing compound selected from the group consisting of organic sulfides in which the sulfur is attached directly to a carbon atom and inorganic sulfides in which the sulfur is attached directly to a metal atom; there being present in said film between 0.1 and 1.0 part of arylamine by weight, per part of film-forming plastic, between 0.1 and 2.0 parts of halogenated hydrocarbon compound by weight, per part of film-forming plastic and between 0.01 and 0.3 part by weight of sulfur compound by weight, per part of film-forming plastic; said composition being prepared in a solvent for the film-forming plastic; depositing said composition on a support; evaporating said solvent, leaving a photosensitive film wherein the arylamine, halogenated hydrocarbon and sulfur-containing compounds are dispersed in said film-forming plastic base material on said support; exposing selected portions of the resulting article to ultraviolet light; and thereafter fixing the resulting brilliantly colored image by exposing the surface of said image bearing article to a moist oxygen-containing gas.

(References on following page)

References Cited in the file of this patent

UNITED STATES PATENTS

| | | |
|---|---|---|
| 1,574,357 | Beebe et al. | Feb. 23, 1926 |
| 1,587,272 | Beebe et al. | June 1, 1926 |
| 1,587,273 | Beebe et al. | June 1, 1926 |
| 2,097,119 | Eggert et al. | Oct. 26, 1937 |
| 2,673,151 | Gerhart | Mar. 23, 1954 |
| 2,789,053 | Elliott | Apr. 16, 1957 |
| 2,905,556 | Fuchsman et al. | Sept. 22, 1959 |

FOREIGN PATENTS

| | | |
|---|---|---|
| 633,715 | Germany | July 16, 1936 |

UNITED STATES PATENT OFFICE

CERTIFICATE OF CORRECTION

Patent No. 3,042,516

July 3, 1962

Eugene Wainer

It is hereby certified that error appears in the above numbered patent requiring correction and that the said Letters Patent should read as corrected below.

Column 2, line 6, for "comprsiing" read -- comprising --; line 41, for "on" read -- of --; line 55, for "means" read -- meant --; same column 2, line 67, strike out "the"; column 4, line 23, for "cl" read -- Cl --; line 57, for "amnies" read -- amines --; column 8, line 58, for "grams", first occurrence, read -- gram --; column 10, line 19, for the claim reference numeral "24" read -- 1 --.

Signed and sealed this 13th day of November 1962.

(SEAL)
Attest:

EFNEST W. SWIDER
Attesting Officer

DAVID L. LADD
Commissioner of Patents